United States Patent
Ogata et al.

(10) Patent No.: US 12,512,724 B2
(45) Date of Patent: Dec. 30, 2025

(54) MOTOR DEVICE

(71) Applicant: MITSUBA Corporation, Gunma (JP)

(72) Inventors: Naoki Ogata, Gunma (JP); Yutaro Jo, Gunma (JP); Daiki Yamamoto, Gunma (JP)

(73) Assignee: MITSUBA Corporation, Gunma (JP)

( * ) Notice: Subject to any disclaimer, the term of this patent is extended or adjusted under 35 U.S.C. 154(b) by 284 days.

(21) Appl. No.: 18/168,539

(22) Filed: Feb. 13, 2023

(65) Prior Publication Data

US 2023/0318400 A1 Oct. 5, 2023

(30) Foreign Application Priority Data

Mar. 29, 2022 (JP) ................................. 2022-053274

(51) Int. Cl.
*H02K 7/08* (2006.01)
*H02K 5/16* (2006.01)
*H02K 7/00* (2006.01)

(52) U.S. Cl.
CPC ................. *H02K 7/08* (2013.01); *H02K 5/16* (2013.01); *H02K 7/006* (2013.01); *H02K 7/081* (2013.01)

(58) Field of Classification Search
CPC ...... H02K 7/081; H02K 7/1166; H02K 5/161; H02K 5/1672; H02K 5/1732; H02K 5/16
USPC .............................................. 310/89, 91, 99
See application file for complete search history.

(56) References Cited

U.S. PATENT DOCUMENTS

| | | | | |
|---|---|---|---|---|
| 5,831,360 A | * | 11/1998 | Senjo | H02K 7/06 310/90 |
| 6,288,466 B1 | * | 9/2001 | Lauk | F16C 27/08 310/90 |
| 2002/0164101 A1 | * | 11/2002 | Bass | F16C 35/0635 384/537 |
| 2009/0160278 A1 | * | 6/2009 | Hong | H02K 5/1732 310/90 |
| 2011/0000737 A1 | * | 1/2011 | Nagase | H02K 5/1735 180/443 |

(Continued)

FOREIGN PATENT DOCUMENTS

JP 2002525005 8/2002
JP 2018194004 A * 12/2018

(Continued)

OTHER PUBLICATIONS

Machine Translation of JP 2019129566A (Year: 2019).*
Machine Translation of KR 100681936 B1 (Year: 2007).*
JP 201819004 Machine Translation (Year: 2018).*

*Primary Examiner* — Christopher M Koehler
*Assistant Examiner* — David Owen Johnson
(74) *Attorney, Agent, or Firm* — JCIPRNET

(57) ABSTRACT

In a motor device, since the bearing support member mounted to the housing and supporting, from the axial direction, the another axial side of the ball bearing (outer race) includes the annular support part (annular flat surface) which supports, from the axial direction, the entire circumference of the another axial side of the ball bearing (outer race), tilting of the ball bearing with respect to the housing can be suppressed in the case where a lateral force acts on the rotating shaft. Therefore, it is possible to improve the fixing strength of the ball bearing to the housing, and thus suppress rattling of the speed reduction mechanism.

3 Claims, 9 Drawing Sheets

(56) References Cited

U.S. PATENT DOCUMENTS

2017/0207686 A1* 7/2017 Yasumoto .............. H02K 5/225
2017/0268573 A1* 9/2017 Yang ....................... F16C 19/16
2017/0366064 A1* 12/2017 Kawaguchi ............ H02K 5/161

FOREIGN PATENT DOCUMENTS

| JP | 2019129566 A | * | 8/2019 | | |
| KR | 100681936 B1 | * | 2/2007 | ............. | H02K 15/14 |

* cited by examiner

MOTOR DEVICE

CROSS-REFERENCE TO RELATED APPLICATION

This application claims the priority benefit of Japan application serial no. 2022-053274, filed on Mar. 29, 2022. The entirety of the above-mentioned patent application is hereby incorporated by reference herein and made a part of this specification.

BACKGROUND

Technical Field

The disclosure relates to a motor device including a speed reduction mechanism which reduces speed of rotation of a rotating shaft.

Related Art

Conventionally, a motor device with a speed reduction mechanism capable of obtaining a large output despite its small size has been adopted as an in-vehicle motor mounted on an automobile or the like. Accordingly, it is possible to easily mount the motor device in a narrow space provided in the vehicle. Such a motor device is described in Patent Document 1 (JP 2002-525005 A), for example.

An electric drive unit (motor device) described in Patent Document 1 includes: an electric motor (motor) including a mover shaft (rotating shaft) rotated by supply of a drive current; and a worm gear (worm wheel) which reduces speed of rotation of the mover shaft to increase torque and outputs the torque-increased rotational force to the outside.

In addition, an inner race of a bearing member (ball bearing) is fixed to the mover shaft by fitting, and an outer race of the bearing member is pushed into a receiving hole of a transmission casing (housing). The outer race pushed into the receiving hole is pressed by a U-shaped holding part having a notch.

However, in the motor device described in Patent Document 1, the outer race of the ball bearing is pressed by the U-shaped holding part. In other words, a part of the entire circumference of the outer race is not pressed by the holding part. Accordingly, when a lateral force acts on the rotating shaft so that the worm separates from the worm wheel during driving of the motor device, there is a risk that the ball bearing would tilt with respect to the housing, causing the speed reduction mechanism to rattle.

SUMMARY

In an aspect of the disclosure, a motor device includes a motor and a speed reduction mechanism. The motor includes a rotating shaft. The speed reduction mechanism reduces speed of rotation of the rotating shaft. The motor device further includes a bearing member, a housing, and a bearing support member. The bearing member rotatably supports the rotating shaft. The housing accommodates the speed reduction mechanism and supports one axial side of the bearing member from an axial direction. The bearing support member is mounted to the housing and supports another axial side of the bearing member from the axial direction. The bearing support member includes an annular support part which supports, from the axial direction, an entire circumference of the another axial side of the bearing member.

According to the disclosure, since the bearing support member mounted to the housing and supporting the another axial side of the bearing member from the axial direction includes the annular support part which supports, from the axial direction, the entire circumference of the another axial side of the bearing member, tilting of the bearing member with respect to the housing can be suppressed in the case where a lateral force acts on the rotating shaft. Therefore, it is possible to improve the fixing strength of the bearing member to the housing, and thus suppress rattling of the speed reduction mechanism.

DESCRIPTION OF THE EMBODIMENTS

An embodiment of the disclosure provides a motor device capable of improving fixing strength of a bearing member to a housing and thus suppressing rattling of a speed reduction mechanism.

An embodiment of the disclosure will be described in detail below with reference to the drawings.

Figure 1:
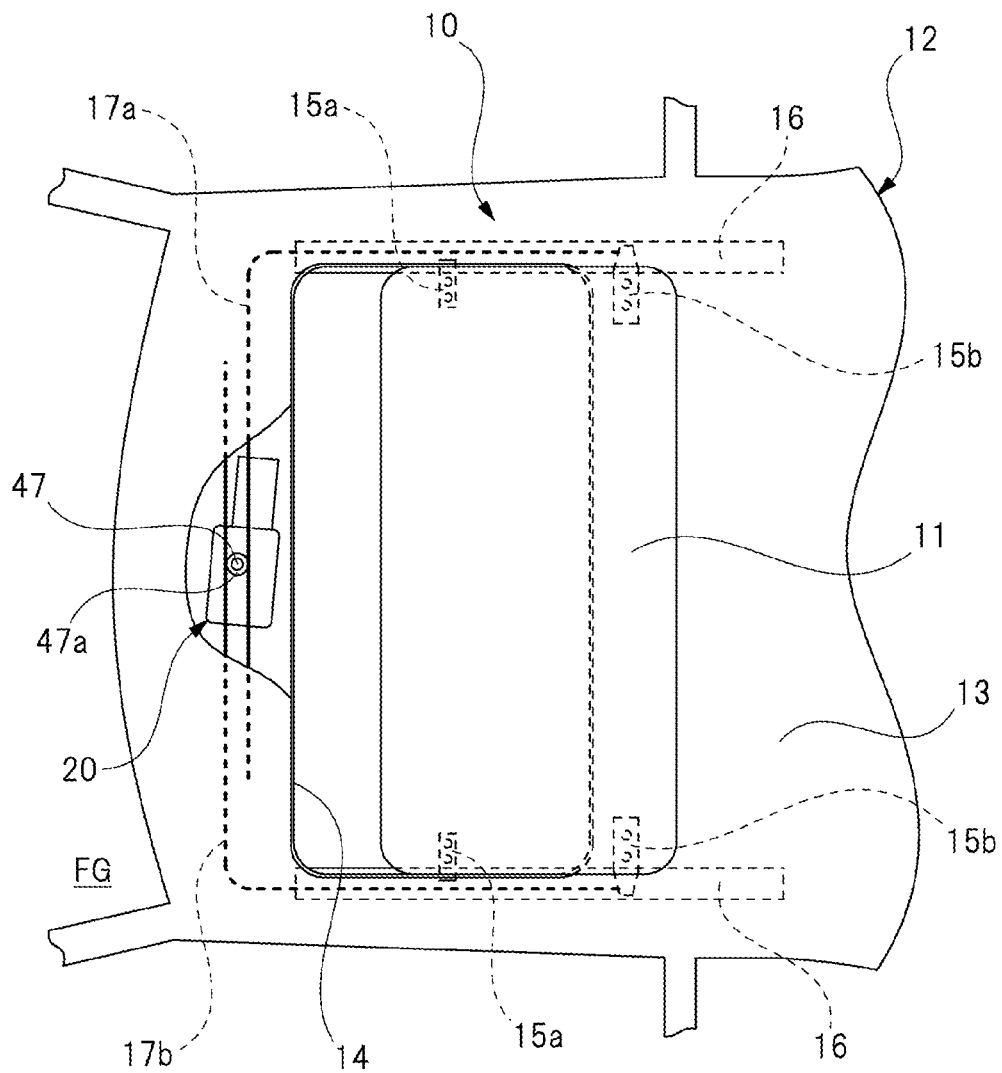
FIG. 1 is a schematic view showing a sunroof device installed at a roof of a vehicle.
Figure 2:
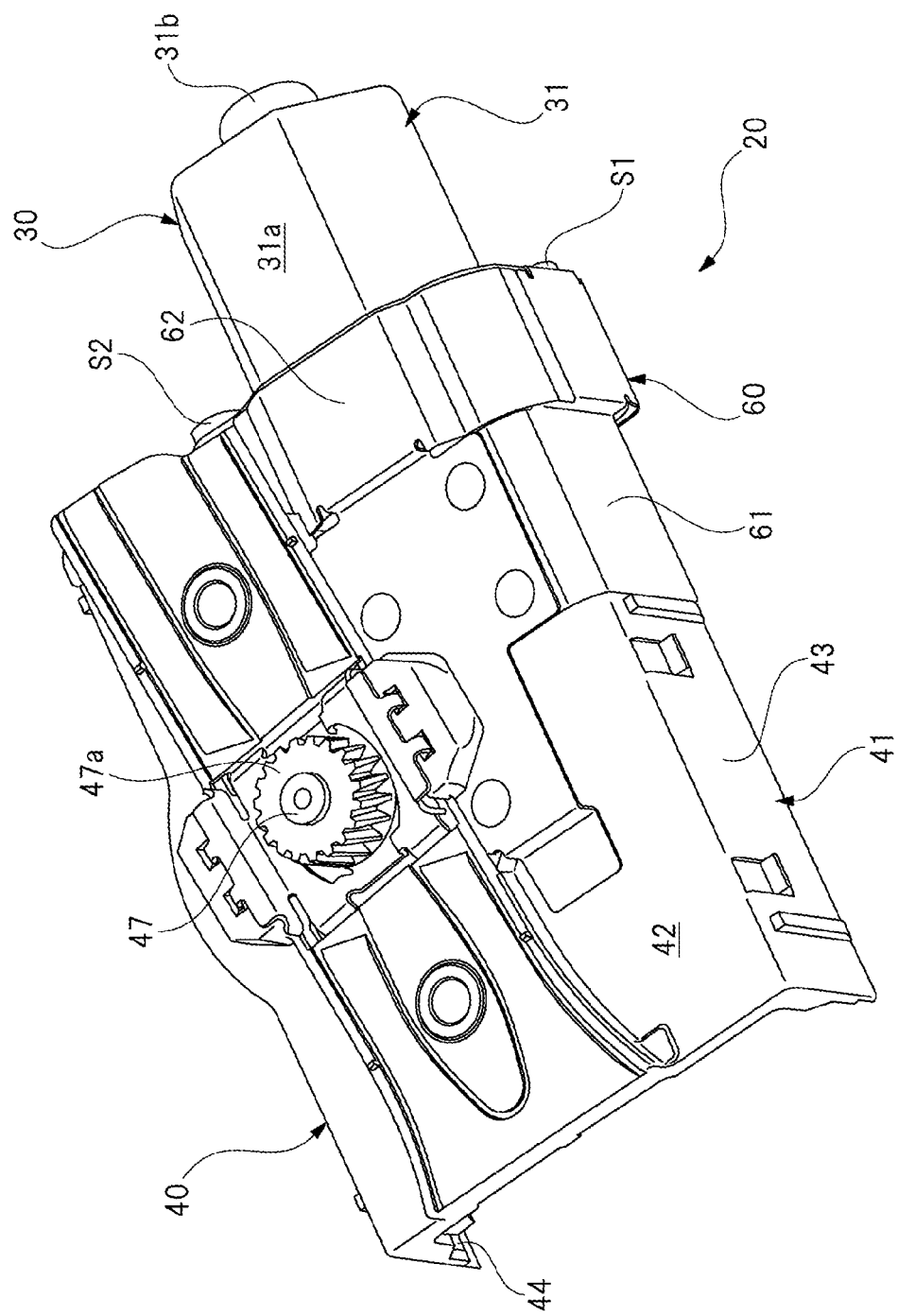
FIG. 2 is a perspective view showing an output gear side of a sunroof motor.
Figure 3:
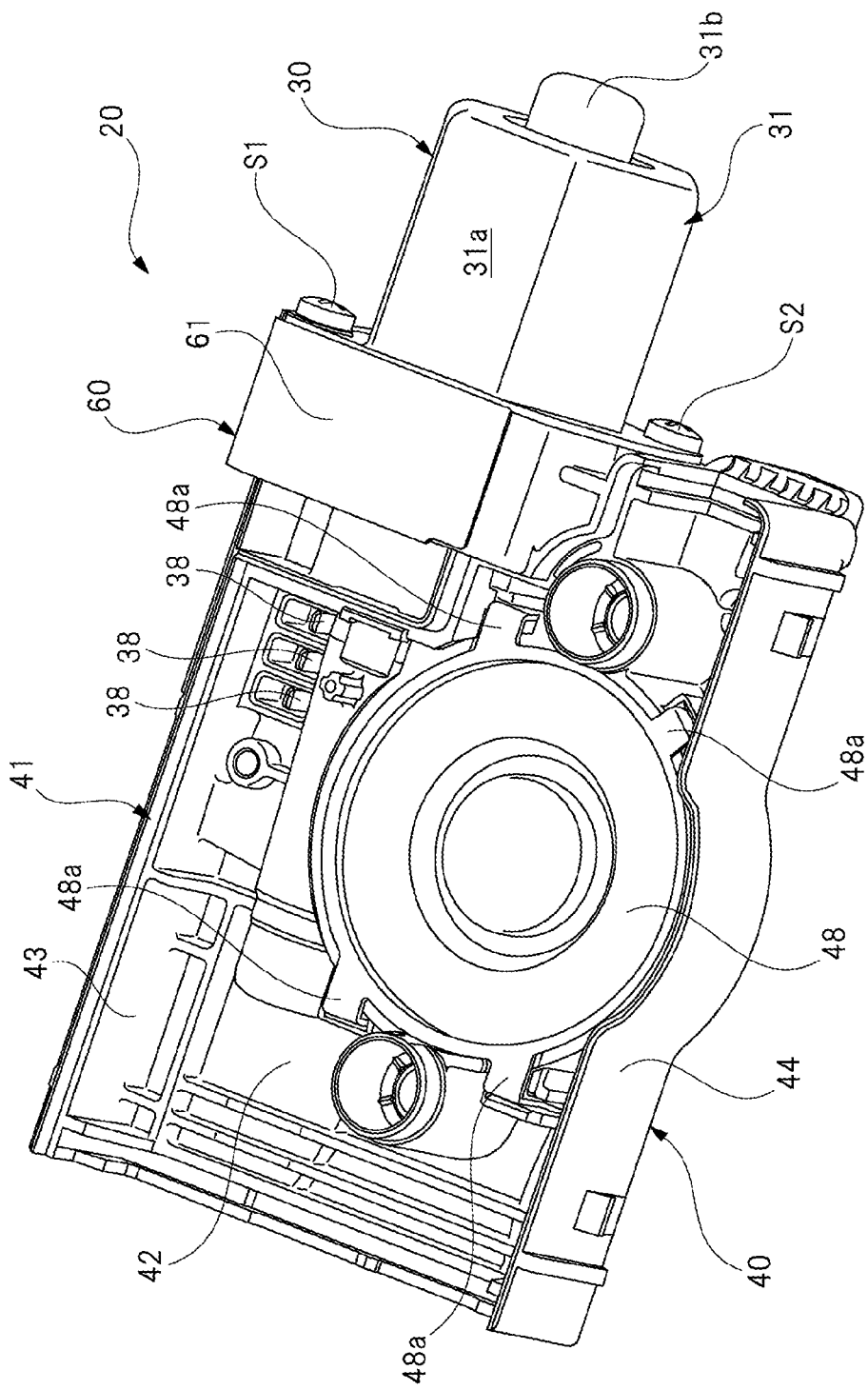
FIG. 3 is a perspective view showing a cover member side of the sunroof motor.
Figure 4:
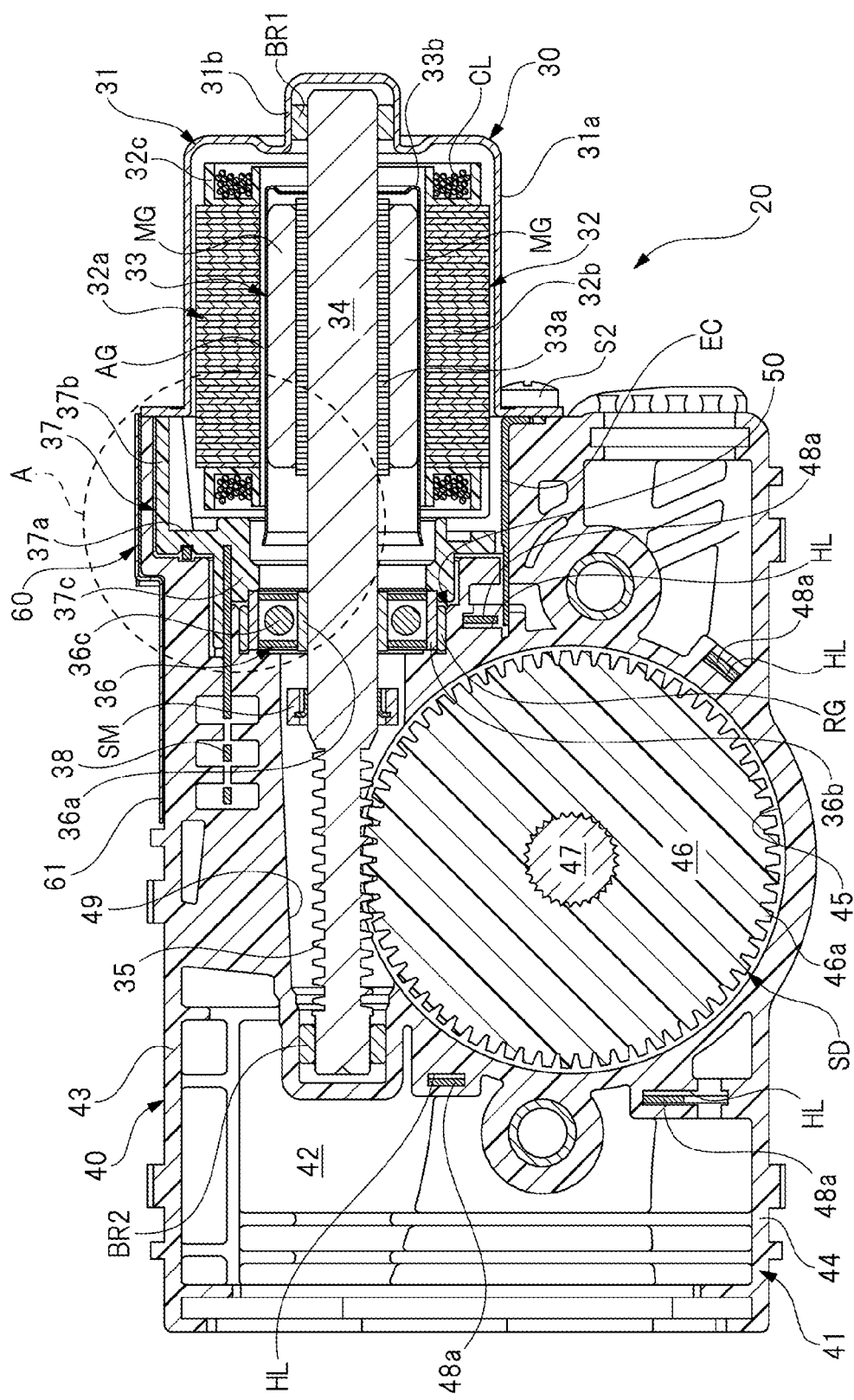
FIG. 4 is a cross-sectional view of the sunroof motor along an axial direction of a rotating shaft.
Figure 5:
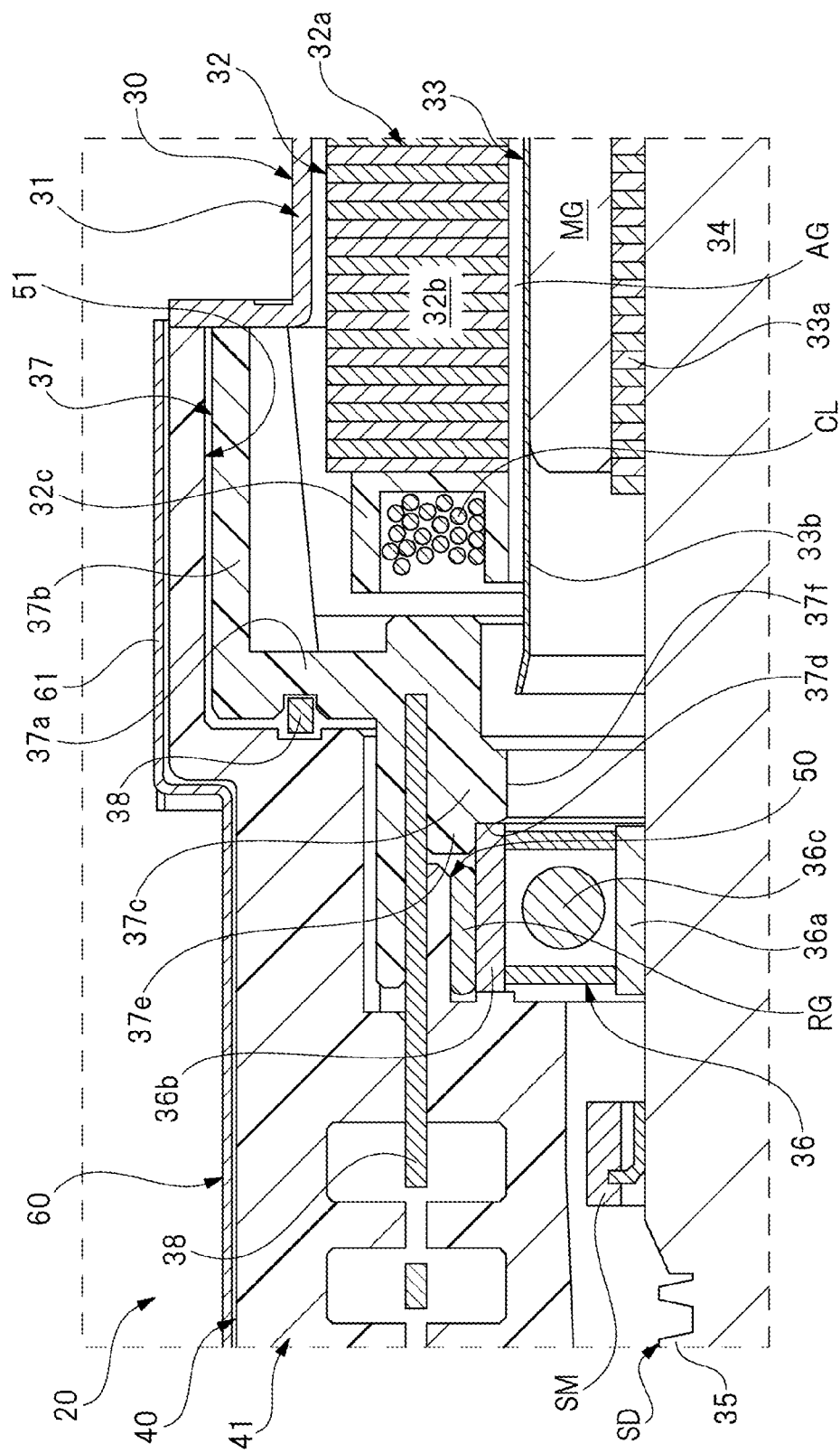
FIG. 5 is an enlarged cross-sectional view of a broken-line circle A portion in FIG. 4.
Figure 6:
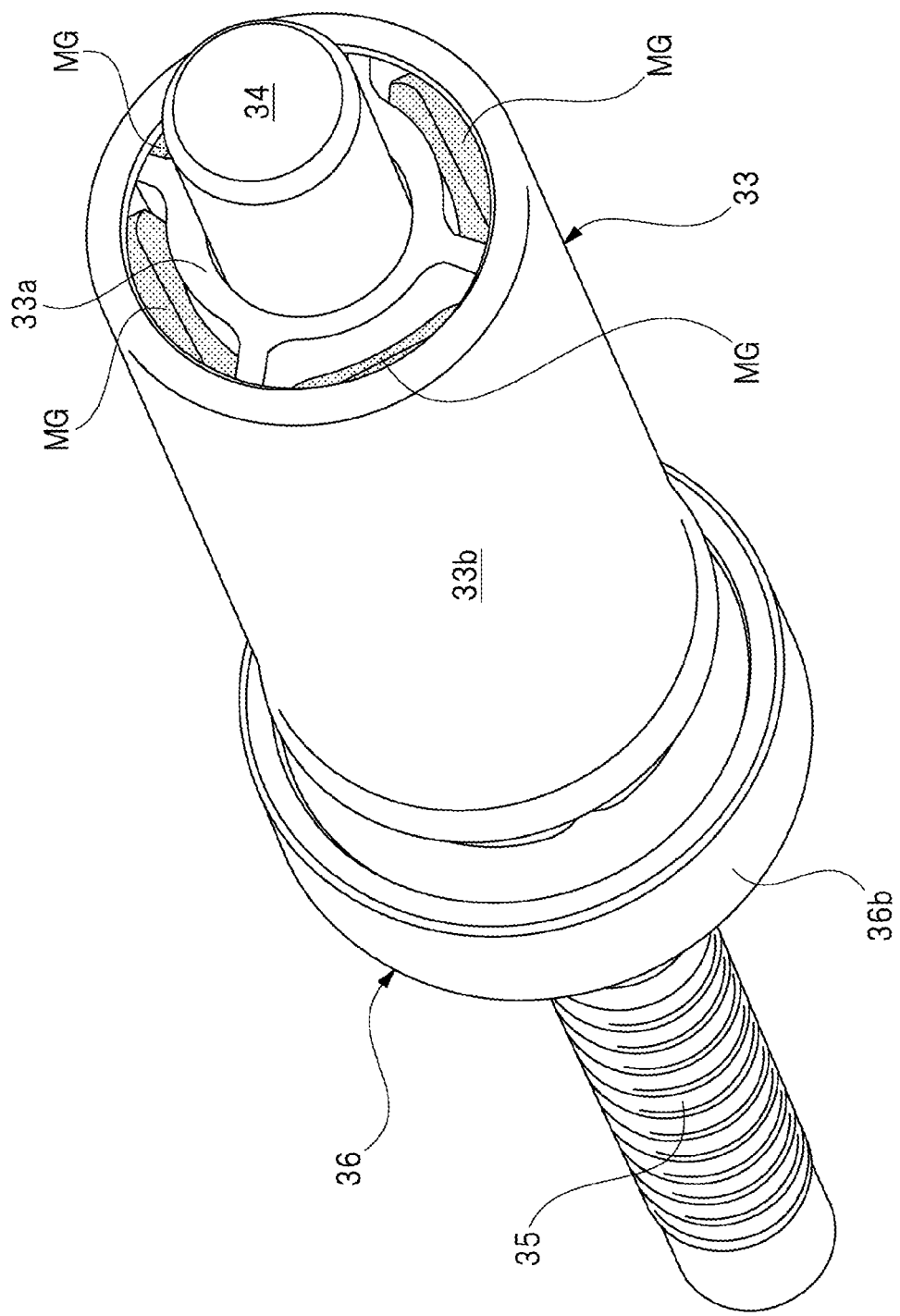
FIG. 6 is a perspective view showing a rotor.
Figure 7:
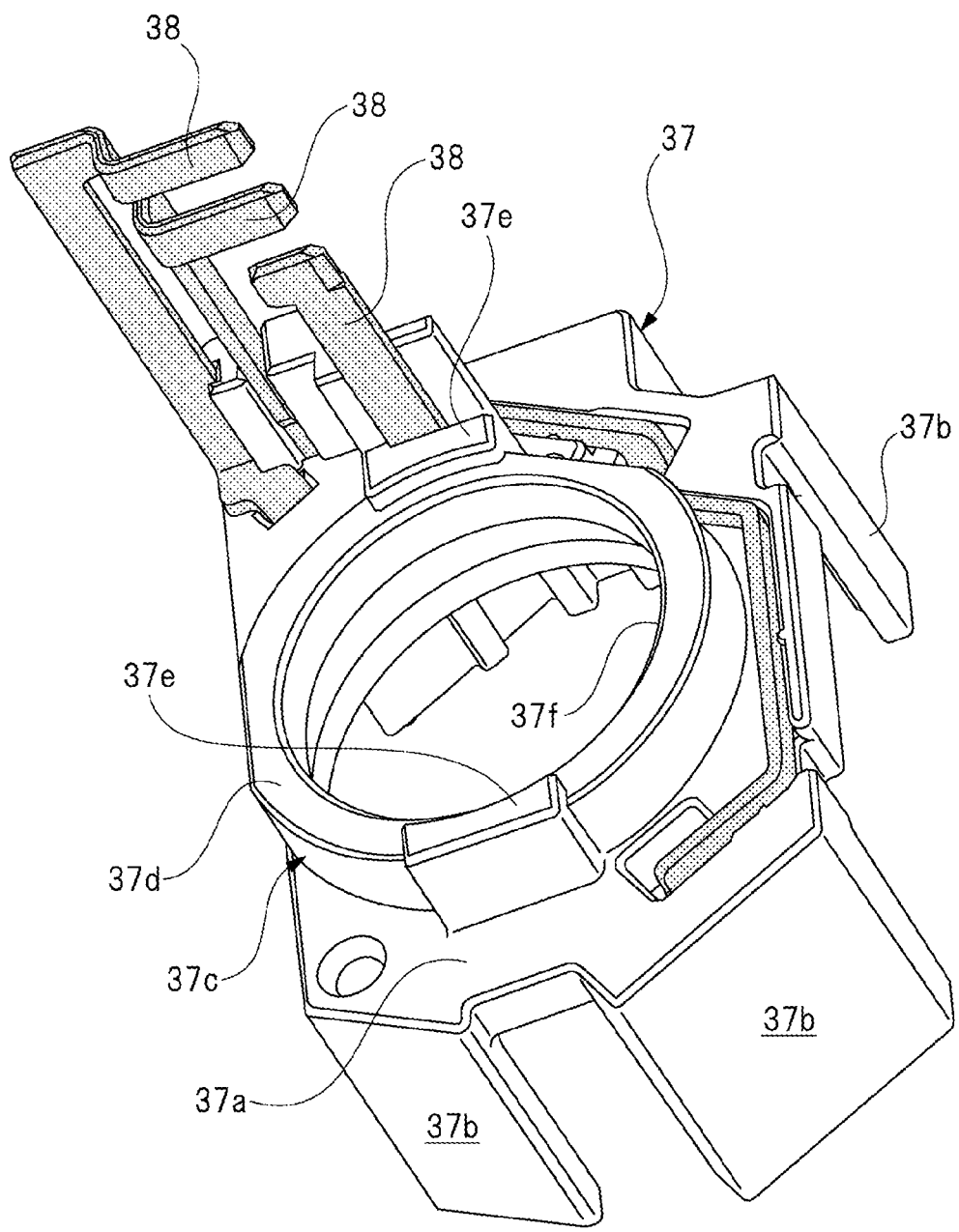
FIG. 7 is a perspective view showing a bearing support member.
Figure 8:
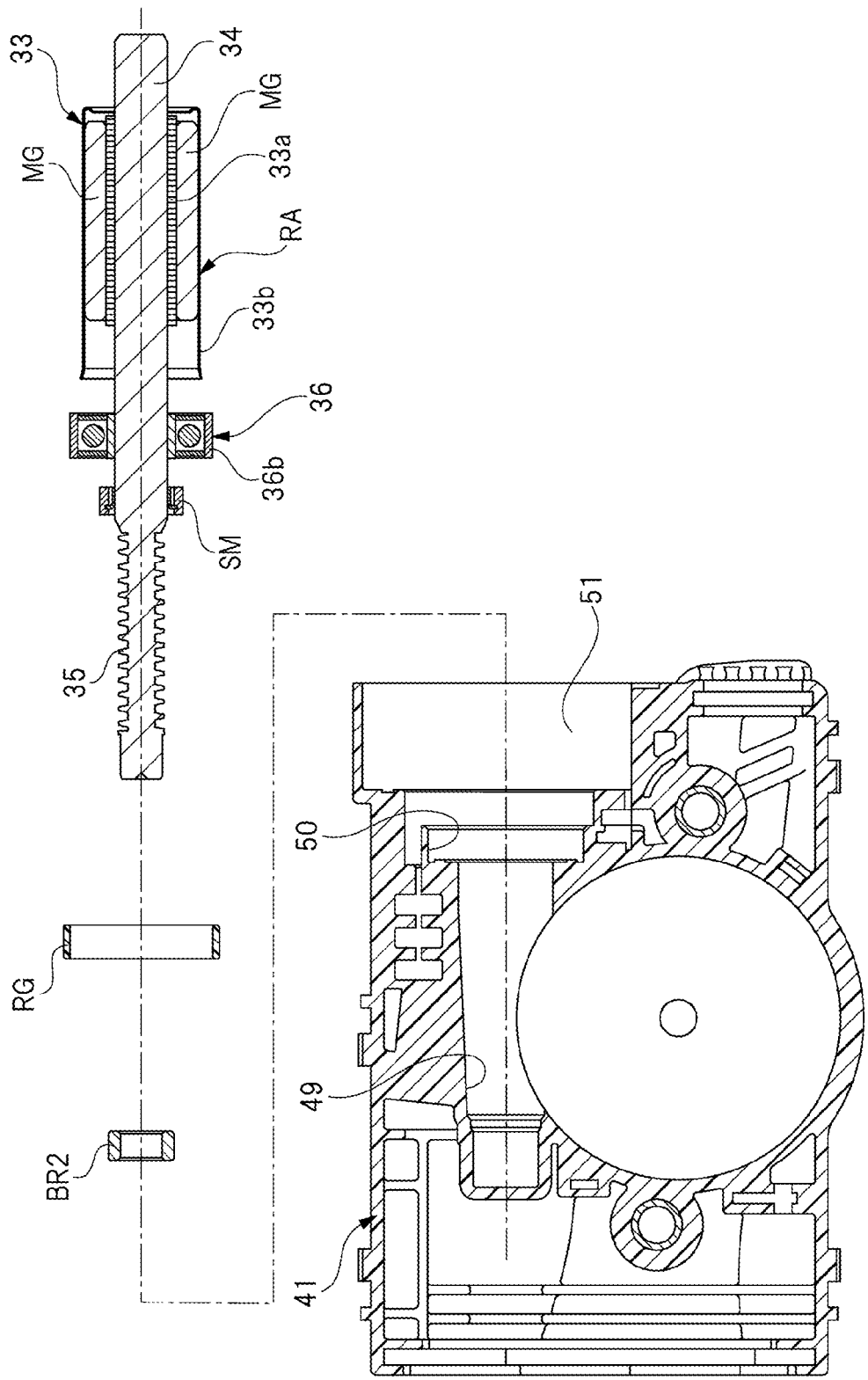
FIG. 8 is an exploded cross-sectional view illustrating an assembly procedure (1) of the sunroof motor.
Figure 9:
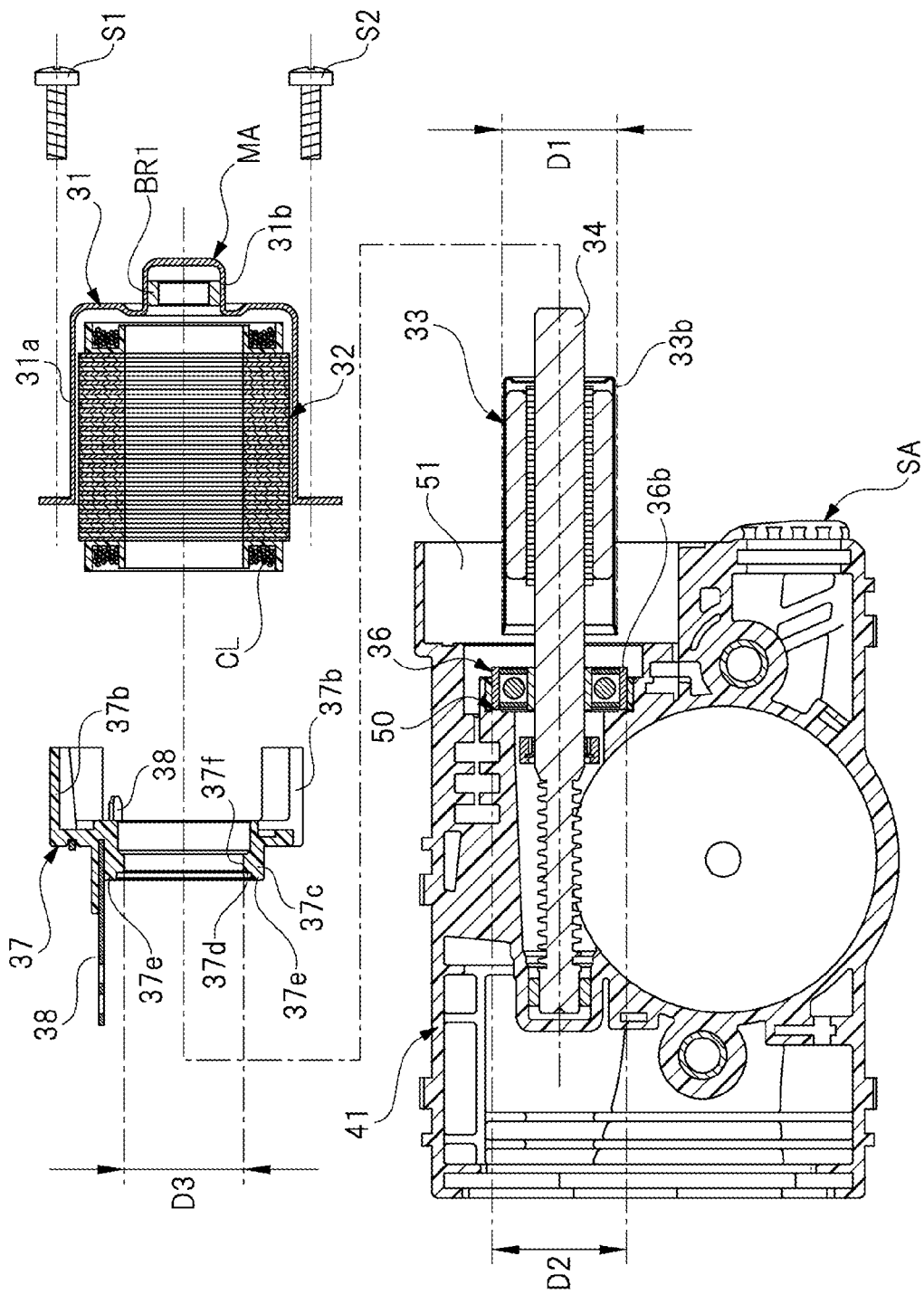
FIG. 9 is an exploded cross-sectional view illustrating an assembly procedure (2) of the sunroof motor.

FIG. 1 is a schematic view showing a sunroof device installed at a roof of a vehicle. FIG. 2 is a perspective view showing an output gear side of a sunroof motor. FIG. 3 is a perspective view showing a cover member side of the sunroof motor. FIG. 4 is a cross-sectional view of the sunroof motor along an axial direction of a rotating shaft. FIG. 5 is an enlarged cross-sectional view of a broken-line circle A portion in FIG. 4. FIG. 6 is a perspective view showing a rotor. FIG. 7 is a perspective view showing a bearing support member. FIG. 8 is an exploded cross-sectional view illustrating an assembly procedure (1) of the sunroof motor. FIG. 9 is an exploded cross-sectional view illustrating an assembly procedure (2) of the sunroof motor.

[Outline of Sunroof Device]

As shown in FIG. 1, a sunroof device 10 includes a roof panel 11. The roof panel 11 opens and closes an opening 14 formed at a roof 13 of a vehicle 12. A pair of shoes 15*a* and 15*b* are fixed to each of vehicle width direction two sides (upper and lower sides in FIG. 1) of the roof panel 11. A guide rail 16 extending in the front-rear direction (left-right direction in FIG. 1) of the vehicle 12 is fixed to each of vehicle width direction two sides of the opening 14 in the roof 13. With the pair of shoes 15*a* and 15*b* being guided by the corresponding pair of guide rails 16, respectively, the roof panel 11 moves in the front-rear direction of the vehicle 12.

One ends of drive cables 17a and 17b attached with gears are connected to the respective shoes 15b arranged on the rear side (right side in FIG. 1) of the vehicle 12. Another ends of the drive cables 17a and 17b are routed to the vehicle 12 front side (left side in FIG. 1) of the opening 14.

A sunroof motor (motor device) 20 is provided on the vehicle 12 front side of the opening 14 and inside the roof 13 between a windshield FG and the roof 13. The another ends of the pair of drive cables 17a and 17b are meshed with an output gear 47a provided at the sunroof motor 20. When the sunroof motor 20 is driven, the pair of drive cables 17a and 17b move in their longitudinal directions in directions opposite to each other. Accordingly, the roof panel 11 is pushed and pulled by the pair of drive cables 17a and 17b via the pair of shoes 15b to open and close the opening 14.

[Outline of Sunroof Motor]

As shown in FIG. 2 to FIG. 4, the sunroof motor 20 includes an electric motor part (motor) 30 and a speed reduction mechanism part 40. The electric motor part 30 and the speed reduction mechanism part 40 are firmly connected to each other and integrated (unitized) by a pair of first fastening screw S1 and second fastening screw S2.

[Electric Motor Part]

The electric motor part 30 is a motor without brushes, i.e., a brushless motor, and includes a yoke (motor case) 31 formed in a bottomed tubular shape by deep-drawing a magnetic body such as a steel plate. The yoke 31 includes a side wall part 31a that forms an outer shell of the electric motor part 30 and has a substantially regular hexagonal cross section. One axial side (right side in FIG. 2 to and FIG. 4) of the side wall part 31a is closed by a stepped bottom wall part 31b.

[Stator]

As shown in FIG. 4 and FIG. 5, a stator 32 is accommodated inside the yoke 31. The stator 32 includes a stator core 32a formed by laminating a plurality of thin steel plates (magnetic bodies). The stator core 32a is fixed to the yoke 31 and includes a total of six teeth 32b (not shown in detail). Coils CL of three phases including a U-phase, a V-phase, and a W-phase are respectively wound around the teeth 32b via an insulator (insulating member) 32c.

[Rotor]

A rotor 33 is rotatably provided on the radially inner side of the stator 32 with a predetermined gap AG (air gap) present therebetween. As shown in FIG. 4 to FIG. 6, the rotor 33 includes a core body 33a formed in a substantially tubular shape. The core body 33a is formed by laminating a plurality of thin steel plates (magnetic bodies), and a total of four permanent magnets MG (see hatched portion in FIG. 6) are fixed by an adhesive or the like to the radially outer side of the core body 33a. Specifically, the permanent magnets MG are arranged at equal intervals (90° intervals) in the circumferential direction of the core body 33a.

Further, the radially outer side of each permanent magnet MG fixed to the core body 33a is covered with a magnet holder 33b that is formed by a thin stainless steel plate or the like into a substantially tubular shape. The magnet holder 33b prevents the permanent magnet MG from falling off from the core body 33a. Accordingly, even if the rotor 33 rotates at high speed, the permanent magnets MG do not fall off from the core body 33a due to the centrifugal force generated at that time.

Herein, the outer diameter dimension of the magnet holder 33b is set to D1 (see FIG. 9), and the outer diameter dimension D1 is the outer diameter dimension of the largest portion of the rotor 33 in the radial direction.

A rotating shaft 34 is fixed to the radially inner side of the core body 33a by press-fitting. That is, the rotating shaft 34 is fixed to the center of rotation of the rotor 33. The rotating shaft 34 is made of a round steel rod (made of metal) to ensure sufficient strength. An axial base end side (right side in FIG. 4) of the rotating shaft 34 is accommodated inside the yoke 31 and is rotatably supported by a first metal (radial bearing) BR1 mounted at the bottom wall part 31b of the yoke 31. On the other hand, an axial tip side (left side in FIG. 4) of the rotating shaft 34 is accommodated inside a housing 41 that forms the speed reduction mechanism part 40 and is rotatably supported by a second metal (radial bearing) BR2 mounted at a worm accommodating part 49 of the housing 41.

A worm 35 that forms a speed reduction mechanism SD is integrally provided on the axial tip side of the rotating shaft 34. That is, the worm 35 is also made of a round steel rod. Accordingly, the rigidity of the worm 35 is increased, the worm 35 is prevented from bending, and thus reliable meshing with a worm wheel 46 is ensured.

Further, a ball bearing (bearing member) 36 is provided at an axial middle part of the rotating shaft 34. That is, the rotor 33 is provided side by side with the ball bearing 36. The ball bearing 36 rotatably supports the rotating shaft 34. Specifically, the ball bearing 36 includes an inner race (inner ring) 36a that is formed by steel into a substantially tubular shape, and an outer race (outer ring) 36b that is formed by steel into a substantially tubular shape in the same manner as the inner race 36a and has a larger diameter than the inner race 36a. In the radial direction of the ball bearing 36, a plurality of balls (steel balls) 36c are provided between the inner race 36a and the outer race 36b.

Herein, the inner race 36a is fixed to the rotating shaft 34 by press fitting. That is, the inner race 36a rotates together with the rotating shaft 34. Further, as shown in FIG. 4, the outer diameter dimension of the rotating shaft 34 is larger than the outer diameter dimension of the worm 35. Accordingly, the ball bearing 36 can be press-fitted into the rotating shaft 34 from the worm 35 side in the axial direction of the rotating shaft 34.

Furthermore, the outer diameter dimension of the ball bearing 36 (outer race 36b) is set to D2 (see FIG. 9), and the outer diameter dimension D2 is larger than the outer diameter dimension D1 of the rotor 33 (D2>D1).

A sensor magnet SM is attached between the worm 35 and the ball bearing 36 in the axial direction of the rotating shaft 34. The sensor magnet SM is used to control the rotational direction and the rotational speed of the rotating shaft 34. The ball bearing 36 is arranged between the sensor magnet SM and the core body 33a in the axial direction of the rotating shaft 34.

[Bearing Support Member]

Further, as shown in FIG. 4, FIG. 5, and FIG. 7, the electric motor part 30 includes a bearing support member 37. The bearing support member 37 corresponds to a bearing support member in the disclosure, and is formed of a resin material such as plastic into a predetermined shape. The bearing support member 37 includes a support body 37a formed in a substantially plate shape and a plurality of mounting wall parts 37b inserted and fitted into the housing 41. That is, the bearing support member 37 is mounted to the housing 41.

The support body 37a of the bearing support member 37 is provided with an annular support part 37c. The annular support part 37c includes an annular flat surface 37d oriented toward the one axial side (left side in FIG. 4 and FIG. 5) of the rotating shaft 34, and the annular flat surface 37d is in contact with the outer race 36b of the ball bearing 36 from the another axial side (right side in FIG. 4 and FIG. 5). That is, the annular support part 37c supports, from the axial direction, the entire circumference of the another axial side of the outer race 36b. The one axial side (left side in FIG. 4 and FIG. 5) of the outer race 36b is supported from the axial direction by the bearing mounting part 50 provided at the housing 41.

Thus, the outer race 36b of the ball bearing 36 is sandwiched between the housing 41 and the bearing support member 37 in the axial direction of the rotating shaft 34. Herein, by fixing the yoke 31 to the housing 41 with the first fastening screw S1 and the second fastening screw S2, the bearing support member 37 is fixed on the inner side of the housing 41 without rattling. That is, the bearing support member 37 is sandwiched between the outer race 36b and the yoke 31 in the axial direction of the rotating shaft 34.

A pair of positioning protrusions 37e are provided integrally with the annular support part 37c. The positioning protrusions 37e are arranged to be opposed to each other at the annular support part 37c, and protrude from the annular support part 37c toward the one axial side. The outer race 36b of the ball bearing 36 enters between the pair of positioning protrusions 37e. Accordingly, during assembly of the sunroof motor 20, it is possible to precisely match (center) the axis of the ball bearing 36 and the axis of the annular support part 37c.

Thus, the pair of positioning protrusions 37e have the function of positioning the ball bearing 36 at the normal position with respect to the annular support part 37c. As shown in FIG. 7, the support body 37a is formed in a substantially rectangular shape when viewed in the axial direction. The pair of positioning protrusions 37e are arranged in a relatively wide space of the support body 37a. Therefore, by providing the pair of positioning protrusions 37e, the size of the support body 37a does not increase.

Herein, a through hole 37f is provided on the radially inner side of the annular support part 37c to penetrate in the axial direction of the annular support part 37c. The inner diameter dimension of the through hole 37f is set to D3 (see FIG. 9), and the inner diameter dimension D3 of the through hole 37f is smaller than the outer diameter dimension D2 of the ball bearing 36 (D3<D2). Therefore, the annular support part 37c can abut against the outer race 36b of the ball bearing 36 from its axial direction. On the other hand, the outer diameter dimension D1 of the rotor 33 is smaller than the inner diameter dimension D3 of the through hole 37f (D1<D3).

Herein, the dimensional relationship in descending order is as follows: the outer diameter dimension D2 of the ball bearing 36, the inner diameter dimension D3 of the through hole 37f, and the outer diameter dimension D1 of the rotor 33 (D2>D3>D1). Therefore, the rotor 33 can be inserted inside the through hole 37f, and the annular flat surface 37d can be brought into contact, from the axial direction, with the entire circumference of the another axial side of the outer race 36b. Therefore, as shown in FIG. 9, the sunroof motor 20 can be easily assembled. The assembly procedure of the sunroof motor 20 will be detailed later.

A total of three conductive members 38 (see hatched portion in FIG. 7) are mounted at the support body 37a. These conductive members 38 are formed by brass or the like having excellent conductivity into a substantially rod shape, and longitudinal one sides thereof (lower side in FIG. 7) are respectively electrically connected to the three-phase coils CL (see FIG. 4 and FIG. 5). On the other hand, longitudinal other sides (upper side in FIG. 7) of the conductive members 38 may be electrically connected to an external connector (not shown) provided on the vehicle 12 (see FIG. 1) side. Accordingly, a drive current is supplied to the three-phase coils CL of the sunroof motor 20 from an in-vehicle battery or the like, and the rotating shaft 34 is rotated in the forward direction or reverse direction.

Thus, in addition to the function of supporting the ball bearing 36, the bearing support member 37 further has a function of holding the total of three conductive members 38.

[Speed Reduction Mechanism Part]

As shown in FIG. 2 to FIG. 4, the speed reduction mechanism part 40 includes a housing 41 that accommodates the speed reduction mechanism SD. The housing 41 is formed by a resin material such as plastic into a substantially flat rectangular parallelepiped shape, and includes a first wall part 42, a second wall part 43, and a third wall part 44. Among the first wall part 42, the second wall part 43, and the third wall part 44, the first wall part 42 occupies the largest proportion.

As shown in FIG. 4, a worm wheel accommodating part 45 is provided on the inner side of the housing 41. The worm wheel accommodating part 45 is arranged at a portion near the third wall part 44. The worm wheel 46 forming the speed reduction mechanism SD is rotatably accommodated inside the worm wheel accommodating part 45. Herein, the worm wheel 46 is made of a resin material such as plastic for weight reduction. A tooth part 46a is provided at the worm wheel 46, and the tooth part 46a is meshed with the worm 35 inside the housing 41.

That is, the speed reduction mechanism SD is a worm speed reducer that provides a relatively large speed reduction ratio. Specifically, in this embodiment, the speed reduction ratio of the speed reduction mechanism SD is "1:67". That is, at this speed reduction ratio, when the worm 35 rotates 67 times, the worm wheel 46 gradually makes one rotation.

Further, the axial base end side of the output shaft 47 made of a round steel rod (made of metal) is fixed to the center of rotation of the worm wheel 46. On the other hand, the output gear 47a (see FIG. 2) with which the pair of drive cables 17a and 17b (see FIG. 1) are meshed is integrally provided on the axial tip side of the output shaft 47.

Therefore, the high-speed rotation of the rotating shaft 34 is reduced by the speed reduction mechanism SD, and the rotational force that has been reduced in speed and increased in torque is transmitted to the pair of drive cables 17a and 17b via the output shaft 47 and the output gear 47a. The speed reduction mechanism SD is formed by the worm 35 and the worm wheel 46.

Herein, the worm wheel accommodating part 45 is opened (not shown) on a side opposite to the first wall part 42 side. As shown in FIG. 3, the opening portion of the worm wheel accommodating part 45 is closed with a cover member 48 formed by pressing a steel plate (made of metal).

The cover member 48 is formed in a substantially disc shape, and a total of four insertion legs 48a are integrally provided at an outer peripheral portion of the cover member 48. These insertion legs 48a extend toward the first wall part 42 side, and as shown in FIG. 4, are inserted into insertion holes HL of the housing 41 in a come-off prevention state.

A longitudinal one side (left side in FIG. 4) of a grounding conductive member EC is electrically connected to one of the insertion legs 48a, and a longitudinal other side (right side in FIG. 4) of the grounding conductive member EC is electrically connected to the yoke 31. Therefore, radiation of electrical noise to the outside of the housing 41 from the axial base end side of the output shaft 47 made of metal is suppressed.

"Electrical noise" herein refers to high-frequency noise that is generated during operation of the sunroof motor 20 and is propagated to metal (magnetic body) parts provided inside the housing 41. When the electrical noise is radiated to the outside such as into the air, it may adversely affect in-vehicle equipment such as a car audio. Therefore, the electrical noise generated by the sunroof motor 20 is grounded (released) to a vehicle body (not shown) of the vehicle 12 (see FIG. 1) as much as possible. The yoke 31 is electrically connected to the vehicle body via a metal motor bracket (not shown).

Further, as shown in FIG. 4, the worm accommodating part 49 is provided on the inner side of the housing 41. The worm accommodating part 49 is arranged at a portion near the second wall part 43. The worm accommodating part 49 is arranged near the worm wheel accommodating part 45, and the insides of these accommodating parts 49 and 45 communicate with each other in the vicinity of the meshed portion between the worm 35 and the tooth part 46a.

The worm accommodating part 49 extends in the axial direction of the rotating shaft 34, and the second metal BR2 which rotatably supports the axial tip side of the rotating shaft 34 is accommodated on the one axial side (left side in FIG. 4) of the worm accommodating part 49.

Furthermore, the bearing mounting part 50 is provided on the inner side of the housing 41. The bearing mounting part is arranged on the another axial side (right side in FIG. 4) of the worm accommodating part 49 and opens toward the yoke 31. The ball bearing 36 is accommodated inside the bearing mounting part 50, and the entire circumference of the one axial side (left side in FIG. 4) of the outer race 36b of the ball bearing 36 is supported by the bearing mounting part 50 from the axial direction.

A bearing support ring RG formed in a substantially tubular shape is fixed to the bearing mounting part 50 by press fitting. The bearing support ring RG is formed of, for example, a sintered material obtained by compacting metal powder. The outer race 36b of the ball bearing 36 is arranged on the radially inner side of the bearing support ring RG with a minute gap (not shown) present therebetween.

Herein, as shown in FIG. 4, the axial base end side (right side in FIG. 4) of the rotating shaft 34 is rotatably supported by the first metal BR1 mounted at the bottom wall part 31b of the yoke 31. Further, the axial tip side (left side in FIG. 4) of the rotating shaft 34 is rotatably supported by the second metal BR2 mounted at the worm accommodating part 49 of the housing 41. The axial middle part of the rotating shaft 34 is rotatably supported by the ball bearing 36 accommodated in the bearing mounting part 50.

That is, the rotating shaft 34 is supported at three points by three bearings (first metal BR1, second metal BR2, and ball bearing 36). Accordingly, during operation of the sunroof motor 20, the worm 35 is prevented from being separated from the tooth part 46a of the worm wheel 46 (disengagement from each other), and the worm 35 and the tooth part 46a can be reliably meshed with each other.

The inner race 36a of the ball bearing 36 is fixed to the rotating shaft 34, and the outer race 36b of the ball bearing 36 is clamped by the bearing mounting part 50 and the bearing support member 37. Therefore, the rotating shaft 34 does not move in its axial direction. Accordingly, it is not necessary to provide thrust bearings on axial two sides of the rotating shaft 34, and thus it is possible to reduce the number of parts.

On the other hand, to have the rotating shaft 34 supported at three points while rotating smoothly, it is required to improve the precision of the parts forming the sunroof motor 20. However, such an improvement in the precision of parts is not realistic because it complicates the manufacturing process and increases the product cost. Therefore, in this embodiment, the ball bearing 36 (outer race 36b) is arranged on the radially inner side of the bearing support ring RG with a minute gap present therebetween.

Accordingly, the minute gap absorbs manufacturing errors of the parts and absorbs linear expansion differences between the parts, so that the rotating shaft 34 can be rotated smoothly. Thus, the "minute gap" formed between the bearing support ring RG and the outer race 36b has a function of absorbing manufacturing errors of the parts or linear expansion differences between the parts forming the sunroof motor 20.

Further, as shown in FIG. 5, FIG. 8, and FIG. 9, a motor accommodating part 51 formed in a substantially box shape is provided on the inner side of the housing 41. The motor accommodating part 51 is arranged on the yoke 31 side (right side in FIG. 5) of the bearing mounting part 50 in the axial direction of the rotating shaft 34.

A part of the electric motor part 30 is accommodated in the motor accommodating part 51. Specifically, as shown in FIG. 5, the mounting wall part 37b of the bearing support member 37 forming the electric motor part 30 is accommodated in the motor accommodating part 51 without rattling.

[Metal Jacket]

As shown in FIG. 2 to FIG. 5, a metal jacket 60 is mounted at an outer portion of the sunroof motor 20. The metal jacket 60 has a function of preventing electrical noise generated inside the sunroof motor 20 from being radiated to the outside of the housing 41. Specifically, the metal jacket 60 has a function of receiving electrical noise that is to escape to around the housing 41 made of a resin material and releasing it to the vehicle body via the yoke 31.

The metal jacket 60 includes a first conductive plate 61 and a second conductive plate 62. The first conductive plate 61 and the second conductive plate 62 are each formed into a predetermined shape by pressing a thin steel plate (magnetic body) made of a material having excellent conductivity. The first conductive plate 61 and the second conductive plate 62 are electrically connected to each other to be conductible to each other.

The first conductive plate 61 partially covers a portion (a portion that enters the housing 41) of the three-phase coils CL protruding from the yoke 31 and the three conductive members 38 in the radial direction of the rotating shaft 34. Accordingly, the electrical noise that is to be radiated to the outside from a portion of the three-phase coils CL and a portion of the total of three conductive members 38 is received by the first conductive plate 61.

The second conductive plate 62 partially covers a portion (a portion that enters the housing 41) of the three-phase coils CL protruding from the yoke 31 and the rotating shaft 34 (worm 35) in the radial direction of the rotating shaft 34. Accordingly, the electrical noise that is to be radiated to the outside from a portion of the three-phase coils CL and a portion of the rotating shaft 34 (worm 35) is received by the second conductive plate 62.

Therefore, the electrical noise to be radiated to the outside of the housing 41 is received by the metal jacket 60 (first conductive plate 61 and second conductive plate 62) and then released (grounded) to the vehicle body via the yoke 31.

Next, an assembly procedure (1) and an assembly procedure (2) of the sunroof motor 20 formed as described above, specifically, a procedure for mounting the electric motor part 30 to the housing 41 will be described in detail with reference to the drawings.

[Assembly Procedure (1)]

As shown in FIG. 8, first, the housing 41, the second metal BR2, the bearing support ring RG, and a rotor assembly RA are prepared. Herein, the rotor assembly RA refers to an assembly in which the sensor magnet SM, the ball bearing 36, the core body 33a, the total of four permanent magnets MG, and the magnet holder 33b are assembled to the rotating shaft 34 formed with the worm 35.

Then, first, the second metal BR2 is mounted to the worm accommodating part 49 along the dot-dashed line. Next, the bearing support ring RG is mounted to the bearing mounting part 50. Afterwards, the worm 35 side of the rotor assembly RA in the axial direction is brought to face the motor accommodating part 51. Then, the worm 35 of the rotor assembly RA is accommodated in the worm accommodating part 49, and the ball bearing 36 is mounted to the bearing mounting part 50.

At this time, the axial tip side of the rotating shaft 34 is rotatably supported by the second metal BR2, and the outer race 36b of the ball bearing 36 is inserted into the bearing support ring RG. Since a minute gap (not shown) is provided between the outer race 36b and the bearing support ring RG, the work of mounting the rotor assembly RA to the housing 41 can be easily performed.

Accordingly, the work of mounting the rotor assembly RA to the housing 41 is completed. Herein, the housing 41 to which the rotor assembly RA has been mounted (assembled) through the assembly procedure (1) will be referred to as a housing sub-assembly SA. The magnetization of the total of four permanent magnets MG is carried out in advance by a magnetization device (not shown) before the rotor 33 is assembled to the housing 41.

[Assembly Procedure (2)]

Next, as shown in FIG. 9, the housing sub-assembly SA, the bearing support member 37, a motor sub-assembly MA, the first fastening screw S1, and the second fastening screw S2 are prepared. Herein, as shown in FIG. 7, the total of three conductive members 38 are mounted to the bearing support member 37. The motor sub-assembly MA refers to an assembly in which the first metal BR1 is mounted to the bottom wall part 31b of the yoke 31 and the stator 32 is fixed to the side wall part 31a of the yoke 31.

Then, first, the side of the bearing support member 37 from which the conductive members 38 protrude is brought to face the motor accommodating part 51 along the dot-dashed line. Next, the plurality of mounting wall parts 37b provided at the bearing support member 37 are fitted into the motor accommodating part 51. At this time, since the outer diameter dimension D1 of the rotor 33 is smaller than the inner diameter dimension D3 of the through hole 37f of the annular support part 37c (D1<D3), the rotor 33 can be easily inserted into the radially inner side of the through hole 37f.

Afterwards, the outer race 36b of the ball bearing 36 enters between the pair of positioning protrusions 37e provided at the bearing support member 37. Since the inner diameter dimension D3 of the through hole 37f is smaller than the outer diameter dimension D2 of the outer race 36b (D3<D2), the entire circumference of the annular flat surface 37d of the annular support part 37c abuts against the another axial side of the outer race 36b from the axial direction.

Thus, the entire circumference of the one axial side (left side in FIG. 9) of the outer race 36b is supported from the axial direction by the bearing mounting part 50, and the entire circumference of the another axial side (right side in FIG. 9) of the outer race 36b is supported from the axial direction by the annular flat surface 37d of the annular support part 37c. Therefore, tilting of the ball bearing 36 (rotating shaft 34) is suppressed.

Next, the motor sub-assembly MA is brought to face the motor accommodating part 51. At this time, the side of the yoke 31 from which the three-phase coils CL protrude is brought to face the motor accommodating part 51. Then, while inserting the rotor 33 into the radially inner side of the stator 32, the opening side of the yoke 31 is brought into contact with the housing 41. At that time, the axial base end side of the rotating shaft 34 is rotatably supported by the first metal BR1.

Afterwards, using a fastening tool (not shown) such as a Phillips screwdriver, the first fastening screw S1 and the second fastening screw S2 are screwed to the housing 41. Accordingly, the yoke 31 and the housing 41 are firmly fixed to each other.

Thus, after the rotor 33 is assembled to the housing 41, the bearing support member 37 and the stator 32 are assembled to the housing 41, and the work of mounting the bearing support member 37 and the motor sub-assembly MA to the housing sub-assembly SA is completed. After going through the assembly procedure (2), the worm wheel 46 (see FIG. 4) is accommodated in the worm wheel accommodating part 45 of the housing 41, and the opening portion of the worm wheel accommodating part 45 is closed with the cover member 48 (see FIG. 3). Accordingly, the assembly work of the sunroof motor 20 is completed.

As detailed above, according to this embodiment, since the bearing support member 37 mounted to the housing 41 and supporting the another axial side of the ball bearing 36 (outer race 36b) includes the annular support part 37c (annular flat surface 37d) which supports, from the axial direction, the entire circumference of the another axial side of the ball bearing 36 (outer race 36b), tilting of the ball bearing 36 with respect to the housing 41 can be suppressed in the case where a lateral force acts on the rotating shaft 34. Therefore, it is possible to improve the fixing strength of the ball bearing 36 to the housing 41, and thus suppress rattling of the speed reduction mechanism SD.

Further, according to this embodiment, the electric motor part 30 includes the rotor 33, and the rotating shaft 34 is fixed at the center of rotation of the rotor 33. The rotor 33 is provided side by side with the ball bearing 36, and the outer diameter dimension D1 of the rotor 33 is smaller than the inner diameter dimension D3 of the annular support part 37c (through hole 37f) (D1<D3). Therefore, when assembling the sunroof motor 20, the rotor 33 can be easily inserted into the radially inner side of the annular support part 37c (through hole 37f). Thus, the assemblability of the sunroof motor 20 can be improved.

Furthermore, according to this embodiment, the electric motor part 30 includes the yoke 31 which rotatably accommodates the rotating shaft 34, and the bearing support member 37 is sandwiched between the ball bearing 36 and the yoke 31 in the axial direction of the rotating shaft 34. Therefore, by simply fixing the yoke 31 to the housing 41, the ball bearing 36 can be fixed (supported) via the bearing support member 37 without rattling.

Further, according to this embodiment, since rattling of the speed reduction mechanism SD is suppressed as described above, it is possible to extend the life of the sunroof motor 20 and improve the assemblability. Therefore, it is possible to save manufacturing energy, which will make it possible to achieve, in particular, Goal 7 (ensure access to affordable, reliable, sustainable and modern energy for all)

and Goal 13 (take urgent action to combat climate change and its impacts) of the Sustainable Development Goals (SDGs) set forth by the United Nations.

Obviously, the disclosure is not limited to the above-described embodiment, and various modifications may be made without departing from the spirit of the disclosure. In the above embodiment, although the disclosure is applied to the sunroof motor 20 used in the sunroof device of the vehicle 12, the disclosure is not limited thereto, and for example, the disclosure may also be applied to an in-vehicle motor (motor device) used in a sliding door device, a power window device, a wiper device, etc. mounted on a vehicle.

In addition, the material, shape, dimension, number, installation position, etc. of each component in the above embodiment are arbitrary as long as the disclosure can be achieved, and are not limited to the above embodiment.

What is claimed is:

1. A motor device comprising:
    a motor comprising a rotor and a rotating shaft being fixed at a center of rotation of the rotor; and
    a speed reduction mechanism which reduces speed of rotation of the rotating shaft,
    the motor device further comprising:
    a bearing member which rotatably supports the rotating shaft;
    a housing which accommodates the speed reduction mechanism and supports one axial side of the bearing member from an axial direction; and
    a bearing support member which is mounted to the housing and supports another axial side of the bearing member from the axial direction, wherein
    the bearing support member comprises an annular support part which supports, from the axial direction, an entire circumference of the another axial side of the bearing member, wherein an outer diameter dimension of the rotor is smaller than a minimum inner diameter dimension of the annular support part, and a pair of positioning protrusions protruding from the annular support part toward the one axial side, wherein an outer race of bearing member enters between the pair of positioning protrusions.

2. The motor device according to claim 1, wherein the rotor is provided side by side with the bearing member.

3. The motor device according to claim 1, wherein the motor comprises a motor case which rotatably accommodates the rotating shaft, and
    the bearing support member is sandwiched between the bearing member and the motor case in the axial direction of the rotating shaft.

* * * * *